Figure 1:
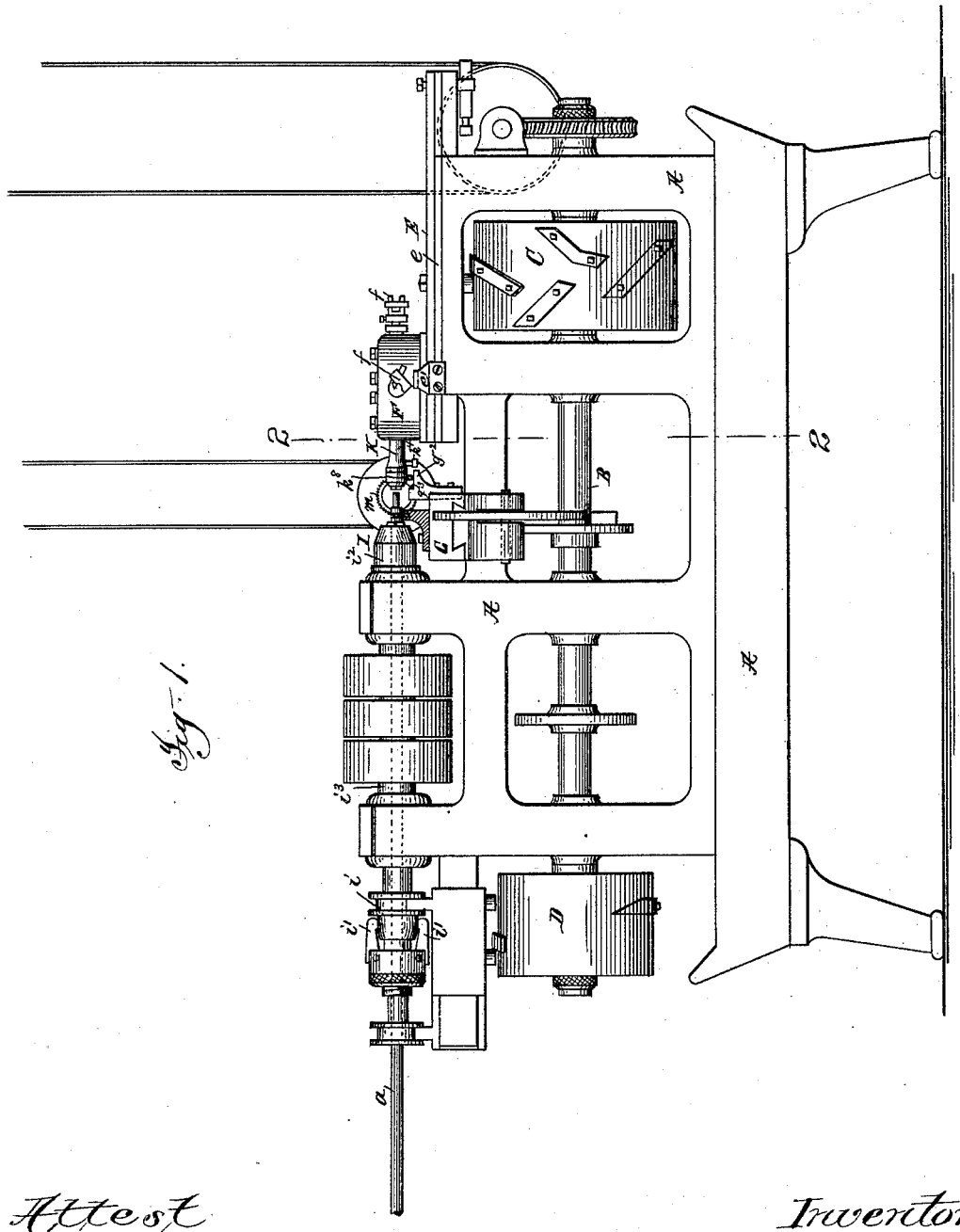

(No Model.) 2 Sheets—Sheet 1.

E. L. BOWERS & J. E. TITUS.
SCREW MACHINE.

No. 469,325. Patented Feb. 23, 1892.

Attest
Geo. H. Bott
Annie L. Hayes

Inventors
Edward L. Bowers
Jonah E. Titus
by their atty's
Chas. F. Dane & Co.

(No Model.) 2 Sheets—Sheet 2.
E. L. BOWERS & J. E. TITUS.
SCREW MACHINE.
No. 469,325. Patented Feb. 23, 1892.
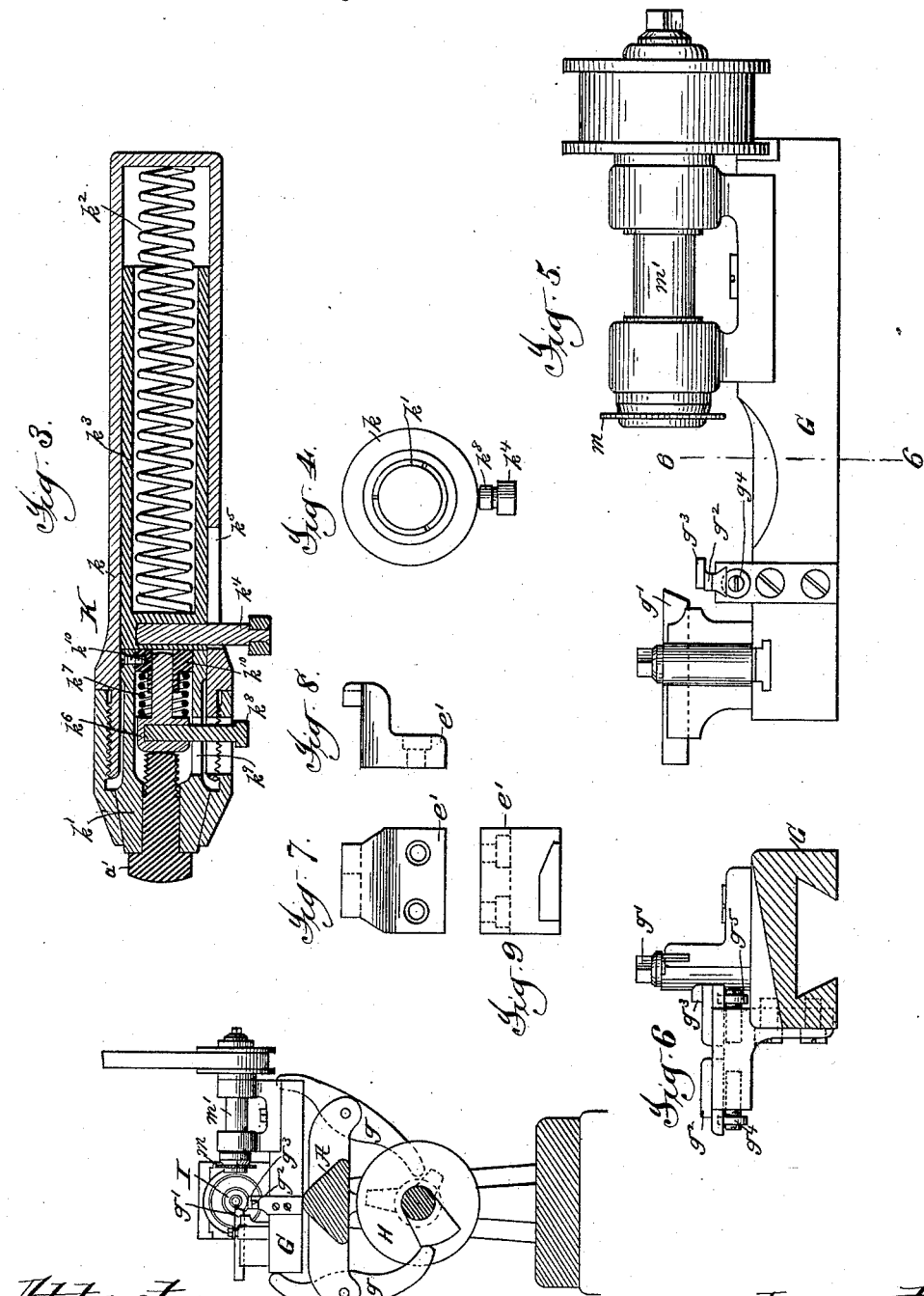
Attest:
Geo H Botts.
Annie L. Hayes.
Inventors
Edward L. Bowers
Jonah E. Titus
by their Atty's
Chas. F. Dane & Co.

UNITED STATES PATENT OFFICE.

EDWARD L. BOWERS AND JONAH E. TITUS, OF ORANGE, MASSACHUSETTS, ASSIGNORS OF ONE-THIRD TO WILLIAM L. GROUT, OF SAME PLACE.

SCREW-MACHINE.

SPECIFICATION forming part of Letters Patent No. 469,325, dated February 23, 1892.

Application filed March 30, 1891. Serial No. 386,956. (No model.)

*To all whom it may concern:*

Be it known that we, EDWARD L. BOWERS and JONAH E. TITUS, citizens of the United States, residing at Orange, county of Franklin, and State of Massachusetts, have invented new and useful Improvements in Screw-Machines, of which the following description, taken in connection with the drawings herewith accompanying, is a specification.

Our invention relates to machines adapted for forming screws, &c., and has for its object to provide the requisite mechanism whereby the screw stock or wire from which screw-blanks and screws are to be formed may be supplied or fed to the machine and the blanks formed or turned, threaded, cut, and separated from the stock or wire and the heads slotted at one operation automatically. This object is attained by providing the machine with a mechanism for grasping the screw after it has been turned and threaded and before it has been cut off or separated from the screw stock or wire and slotting the head of the same automatically.

According to our invention we provide the usual turret or tool-carrier with a chuck which is adapted to be moved forward by a movement of the turret-carriage and open to receive within its grasp the stem of the screw or blank after the latter has been formed and while it is being cut from the screw stock or wire. After the screw has been severed from the latter the chuck recedes and closes on the screw to hold the same firmly in its grasp. Thereafter a rotating saw carried by the cross-slide is moved forward by a movement of the latter in line with the screw held in the said chuck to slot the same as it is moved into engagement therewith by the action of the turret-carriage. After the screw has been thus operated upon the chuck is opened and the screw ejected therefrom.

Our invention consists more particularly in this specification of the peculiar construction of the said chuck for grasping and handling the screw and its operation, in combination with the other parts forming the machine, as will hereinafter be more fully described in detail, and pointed out in the claims.

Referring to the drawings, Figure 1 represents the front elevation of a machine embodying our invention; Fig. 2, a sectional view through line 2 2 of Fig. 1, showing the cross-slide and the several parts supported thereon; Fig. 3, a longitudinal sectional view through the center of the chuck carried by the turret; Fig. 4, a front end view of the same; Fig. 5, a side elevation of the cross-slide detached from the machine with the several parts supported thereon; Fig. 6, a sectional view through line 6 6 of Fig. 5, showing the tool for cutting the screw from the wire and the stops for engaging with the chuck carried by the turret. Figs. 7, 8, and 9 represent the side, end, and plan views, respectively, of a device secured to the turret-carriage for engaging with the chuck carried by the turret.

To explain in detail, A represents the framework of the machine; B, the driving-shaft; C and D, cam-carrying pulleys located on said driving-shaft; E, the sliding carriage supported in ways $e\ e$ on the frame A and operated by the cams located on the pulley C; F, the turret or tool-carrier mounted on said sliding carriage; G, the cross-slide operated by levers $g$ and $g;$ H, a cam-carrying disk for operating said levers $g\ g$, and I the chuck, the latter being adapted to be opened and closed in the usual manner by means of the sliding conical collar $i$ and levers $i'\ i'$ through the medium of the head $i^2$ and hollow supporting-spindle $i^3$.

The construction, arrangement, and operation of the above-mentioned parts being well understood by those skilled in the art and not of our present invention, it is thought to be unnecessary to describe the same in detail herein.

The screw stock or wire represented at $a$ is adapted to be inserted through the hollow spindle $i^3$ and chuck I, with one end projecting, the latter, as shown in Fig. 1, to be held and rotated thereby in a manner to be operated upon in the usual way by suitable tools $f\ f$, carried by the turret F to have the screw turned and the thread cut thereon, and when thus formed be cut from the screw stock or wire by means of a cutting-tool $g'$, supported by the cross-slide G. In this instance and according to our invention we have also provided the turret F with a chuck K, supported thereby in the usual manner. This chuck K consists, as more clearly shown in Fig. 3, of an outer supporting-shell $k$, open at one end and provided with inner tapering walls at said open end, the jaws $k'$ being secured at one end to a supporting-head $k^{10}$ and at their opposite free end are tapered to conform to the said tapering end of the shell $k$ in such manner that the same are compressed or closed when pushed forward and opened by reason of their elasticity when released or allowed to move backward in the usual manner. These said jaws are held in a normal closed position by means of a coiled spring $k^2$, located at the rear end of the shell $k$, which exerts a forward pressure against their supporting-head. The forward end of this spring is inclosed in a cap or shell $k^3$, loosely supported in the outer supporting-shell $k$ and provided with an arm $k^4$, projecting therefrom through a longitudinal slot or opening $k^5$ in the outer shell $k$ in such manner that when the turret is carried forward by a movement of its carriage said arm $k^4$ is adapted to engage with a stop or projection $g^2$ on the cross-slide G, as shown in Fig. 1, and compress the spring $k^2$ to allow the jaws of the chuck to open before reaching the screw formed upon the end of the wire $a$ and pass over and receive the same within its grasp. When the screw has been cut or severed from the wire $a$, the cross-slide recedes to move the cutting-tool $g'$ from engagement with said wire and at the same time moves the stop $g^2$ from engagement with the arm $k^4$ to permit the spring $k^2$ to close the jaws $k'$ upon the screw supported thereon, as shown at $a'$ in Fig. 3, and hold the same to be operated upon, as will be described.

We also provide an "ejector," so called, located within the opening between the jaws $k'$, consisting of a rod or plunger $k^6$, elastically supported in a normally-extended position adjacent to the forward end of the chuck by means of a coiled spring $k^7$, which has its bearing against the said supporting-head $k^{10}$. This ejector is also provided with an arm $k^8$, projecting therefrom through a longitudinal slot or opening $k^9$ between the jaws of the chuck and a corresponding slot or opening in the outer shell $k$, forward of the said arm $k^4$. The arm $k^8$ is shorter and does not project the shell $k$ as far as the said rear arm $k^4$, in order that it may pass over the said stop or projection $g^2$, when the chuck is moved forward, without engaging therewith. It is, however, adapted to engage with a second stop or projection $g^3$ on the cross-slide as the chuck is carried forward and the jaws have begun to open to receive the screw, as before described, in order to hold the ejector stationary or move the same to the rear of the chuck to allow for the admission of the screw between the jaws of the same. As the chuck recedes with the screw in its grasp, the arm $k^4$ is released from engagement with its engaging stop $g^2$ to allow the spring $k^2$ to bear against the head $k^{10}$ and cause the jaws to close on the screw, as before described, and at the same time the ejector $k^6$ is allowed to gradually move against the end of the screw, as its retaining-arm $k^8$ is also moved from engagement with its engaging stop $g^3$. When the chuck has thus retreated with the screw in its grasp, the cross-slide G is moved forward to bring a rotating saw $m$, which is attached to a rotating spindle $m'$, supported in suitable bearings on said cross-slide, forward into a position in line central with the screw supported in said chuck. After this movement of the cross-slide the chuck K is carried forward by a movement of the turret and carriage to move the screw carried thereby into engagement with the rotating saw to have the slot or groove cut therein. After the screw has been thus slotted, the chuck K recedes with the screw in its grasp, the cross-slide is moved back to carry the saw to its former position, and the chuck I opens to allow the wire $a$ to be fed forward the length of a screw, and then closes to hold and rotate the same to have another screw formed by the proper tools carried by the turret F. As the screw is thus being formed (it being understood that the turret revolves in the usual manner to bring into position the proper forming-tools) the screw held in the chuck K is retained thereby until the turret has partially rotated and the arm $k^4$ is brought into contact with a stud or projection $e'$, (shown in detail in Figs. 7, 8, and 9,) located on the sliding carriage E, which serves to compress the spring $k^2$ and allow the jaws of the chuck to open and the ejector $k^6$ to eject the screw therefrom. The screws when thus ejected fall into a suitable receptacle adapted to receive the same.

The stops or projections $g^2$ and $g^3$, adapted for engaging with the arms $k^4$ and $k^8$ to operate the jaws of the chuck and the ejector $k^6$, as hereinbefore described, are in the present instance, and as more clearly shown in Fig. 6, seated in grooves in the cross-slide and adjustably held in position by means of screws $g^4$ and $g^5$. The object of the said stops being adjustable, as described, is to allow their position to be changed or adjusted to engage with the arms $k^4$ and $k^8$ sooner or later, as desired, and thereby control the action of the action of the chuck and ejector, as will be readily understood. Such adjustability is also desirable to allow for the wear of engaging parts, &c., although it is obvious that the same may be fixed and formed integral with the cross-slide or part thereof.

Having thus set forth our invention, what we claim as new, and desire to secure by Letters Patent of the United States, is—

1. In a machine adapted for forming screws, &c., the combination, with a chuck and a cross-slide supporting a sawing mechanism, of a chuck carried by the turret, provided with a device for operating the jaws of the same and with an ejector or spring-actuated plunger, both of said devices being provided with a projecting arm adapted to engage stops or projections located on the machine to operate the devices to which they are attached, substantially as described, and for the purpose set forth.

2. In a machine adapted for forming screws, &c., the combination, with a rotating chuck for turning the screw stock or wire, a turret provided with tools for forming the blank or screw from said wire, and with a chuck for grasping said blank or screw when thus formed, of a reciprocating cross-slide provided with a device for cutting said screw or blank from the wire, and with a sawing mechanism for slotting the screw held in said chuck, substantially as described, and for the purpose set forth.

3. In a machine adapted for forming screws, &c., the combination, with the chuck and a cross-slide provided with a sawing mechanism supported thereon, of a chuck carried by the turret, provided with a spring for closing the jaws of the same and a device for engaging said spring to allow said jaws to open, adapted to be operated substantially as and for the purpose set forth.

4. The combination, in a machine with a rotating chuck and a sawing mechanism, of a chuck carried by the turret, provided with an ejector or spring-actuated plunger located therein, having an arm adapted to engage with a stop or projection on the machine to operate said ejector, in a manner substantially as described, and for the purpose set forth.

5. In a machine adapted for forming screws, &c., the combination, with a chuck and a cross-slide provided with a sawing mechanism supported thereon, of a chuck carried by the turret, adapted to be automatically opened when moved in one direction and closed when moved in the opposite direction, substantially as described, and for the purpose set forth.

6. A chuck consisting of an outer supporting-shell, jaws located within said shell, a spring for acting upon the rear end of said jaws to hold the engaging ends of the same in a normal closed position, and a cap or shell for engaging the forward end of said spring and provided with an arm projecting through the outer shell, whereby said spring may be compressed to release the pressure upon said jaws to allow the latter to open, substantially as and for the purpose set forth.

7. A chuck provided with an ejector or spring-actuated plunger located therein to the rear of the engaging jaws and provided with a projecting arm as a means whereby it may be operated, substantially as described.

8. In a screw-machine, the combination, with a chuck and a cross-slide provided with a sawing mechanism, of a chuck carried by the turret, provided with a device for operating the jaws of the same and with an ejector or spring-actuated plunger, both of said devices being provided with a projecting arm adapted to engage adjustable stops or projections with which the said cross-slide is provided, substantially as and for the purpose set forth.

EDWARD L. BOWERS.
JONAH E. TITUS.

Witnesses:
WALTER L. RANNEY,
GEORGE F. SMITH.